H. H. ABBE.
Door Bell.
No. 48,637. Patented July 11, 1865.
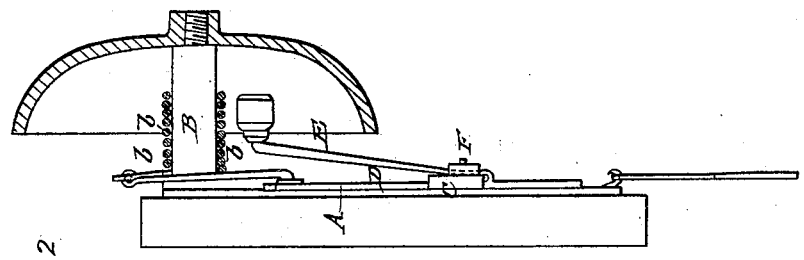
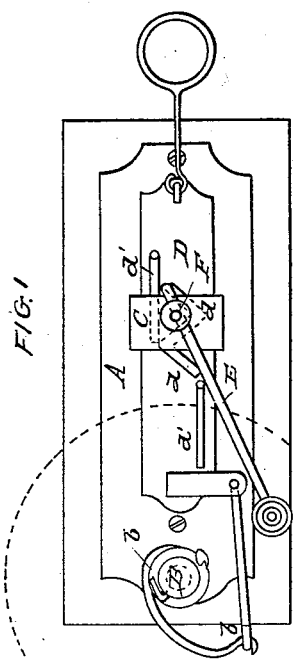
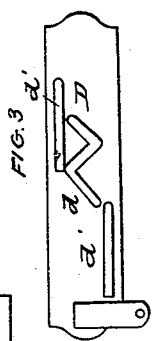
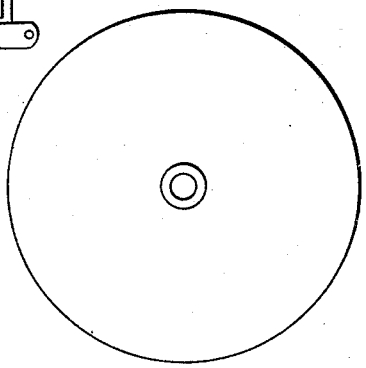
WITNESSES
INVENTOR
Horatio H. Abbe.

UNITED STATES PATENT OFFICE.

HORATIO H. ABBE, OF CHATHAM, CONNECTICUT.

IMPROVED DOOR BELL OR GONG.

Specification forming part of Letters Patent No. 48,637, dated July 11, 1865.

*To all whom it may concern:*

Be it known that I, HORATIO H. ABBE, of the town of Chatham, in the county of Middlesex, in the State of Connecticut, have invented a new and Improved House Gong-Bell; and I do hereby declare that the following is a full and exact description thereof, reference being had to the accompanying drawings, and to the letters of reference marked thereon.

To enable others skilled in the art to make and use my invention, I will proceed to describe its construction and operation.

I use for the base of my bell a plate, A, with the post B, to which the bell proper is attached, and the clasp C, beneath which the slide D works up and down, and upon the top of which the ball-lever or clapper-stem E is attached to a pivot, F, in a manner to give the clapper free lateral motion. The straight grooves near the edges of the slide d' are designed to keep it in place, and the central zigzag groove, d, receives the foot of the ball-lever or clapper-stem E below its pivot attachment, and when the slide D moves the foot of the lower or short arm of the ball-lever or clapper-stem follows the zigzag groove d, giving to the clapper three stroug and rapid strokes. The spring b, extending from the bell-post B and attached to the slide D, forces the slide back, giving also three strong and rapid strokes to the clapper, the same as produced by the pull. The motion of the slide may be readily shortened, so as to obtain two or even one stroke at a pull.

What I claim as my invention, and desire to secure by Letters Patent, is—

The use of a sliding groove, or its equivalent, in combination with the clapper E and the spring b, for the purposes specified.

HORATIO H. ABBE.

Witnesses:
F. GEORGE MARKHAM,
CLARK STRONG.